US008249636B2

(12) United States Patent
Tu et al.

(10) Patent No.: US 8,249,636 B2
(45) Date of Patent: Aug. 21, 2012

(54) METHOD AND APPARATUS FOR DETECTING ADVERSE CHANNEL CONDITIONS AND CONSERVING POWER

(75) Inventors: Alex Kuang-Hsuan Tu, San Diego, CA (US); Virat Deepak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 813 days.

(21) Appl. No.: 11/392,325

(22) Filed: Mar. 28, 2006

(65) Prior Publication Data

US 2007/0082688 A1   Apr. 12, 2007

Related U.S. Application Data

(60) Provisional application No. 60/726,471, filed on Oct. 12, 2005.

(51) Int. Cl.
*H04B 7/00* (2006.01)
(52) U.S. Cl. ........................................ 455/510; 370/311
(58) Field of Classification Search .................. 455/574; 370/311
See application file for complete search history.

(56) References Cited

U.S. PATENT DOCUMENTS

| | | | |
|---|---|---|---|
| 6,343,213 B1 | 1/2002 | Steer et al. | |
| 7,397,777 B1 | 7/2008 | Sudo et al. | |
| 2002/0137513 A1 | 9/2002 | Aihara et al. | |
| 2003/0179727 A1* | 9/2003 | Soong et al. | 370/328 |
| 2004/0018876 A1* | 1/2004 | Kubota et al. | 463/42 |
| 2004/0052230 A1* | 3/2004 | Soliman | 370/335 |
| 2004/0235537 A1 | 11/2004 | Koga et al. | |
| 2005/0201332 A1* | 9/2005 | Bakshi et al. | 370/333 |
| 2006/0035588 A1* | 2/2006 | Chapelle | 455/13.3 |

FOREIGN PATENT DOCUMENTS

| | | |
|---|---|---|
| EP | 1143756 A1 | 10/2001 |
| EP | 1 565 015 A2 | 8/2005 |
| JP | 2001128210 A | 5/2001 |
| JP | 2001128226 A | 5/2001 |
| JP | 2001169339 A | 6/2001 |
| JP | 2005223711 A | 8/2005 |
| KR | 20050080836 A | 8/2005 |
| KR | 100730548 | 6/2007 |
| WO | WO 2004/042941 A1 | 5/2004 |

OTHER PUBLICATIONS

International Search Report and Written Opinion—PCT/US2006/040172, International Search Authority—European Patent Office—Apr. 2, 2007.

* cited by examiner

*Primary Examiner* — Marcos Batista
(74) *Attorney, Agent, or Firm* — Kenyon Jenckes; Won Tae Kim (57) ABSTRACT

A wireless device detects for an adverse channel condition, which may be (1) a frequent out of service (FOOS) condition indicative of frequent in and out of service or (2) an unbalanced forward/reverse link condition indicative of unbalanced coverage for the forward and reverse links. A FOOS condition may be detected based on an average in-service time, the number of lost system connections, the number of systems to which connections have been made, the rate of change for the systems, the altitude of the wireless device, and/or other parameters. An unbalanced forward/reverse link condition may be detected based on the average in-service time, the number of system access failures, and/or other parameters. The wireless device performs at least one action to conserve battery power if an adverse channel condition is detected. The action(s) may include performing system acquisition less frequently, disabling system registration, performing registration less frequently, and/or going to sleep.

30 Claims, 4 Drawing Sheets

| System Connection $n$ | Connection Start Time $T(n)$ | In-Service Time $IST(n)$ | System Identifier SID/NID | System Access Failure |
|---|---|---|---|---|
| 1 | $T_1$ | 10 | sid1/nid1 | no |
| 2 | $T_2$ | 23 | sid2/nid2 | yes |
| 3 | $T_3$ | 15 | sid3/nid3 | no |
| ⋮ | ⋮ | ⋮ | ⋮ | ⋮ |

| System Connection n | Connection Start Time T(n) | In-Service Time IST(n) | System Identifier SID/NID | System Access Failure |
|---|---|---|---|---|
| 1 | $T_1$ | 10 | sid1/nid1 | no |
| 2 | $T_2$ | 23 | sid2/nid2 | yes |
| 3 | $T_3$ | 15 | sid3/nid3 | no |
| ⋮ | ⋮ | ⋮ | ⋮ | ⋮ |

METHOD AND APPARATUS FOR DETECTING ADVERSE CHANNEL CONDITIONS AND CONSERVING POWER

The present application claims priority to provisional U.S. Application Ser. No. 60/726,471, entitled "Frequent Out of Service (FOOS) Detection Algorithm," filed Oct. 12, 2005, assigned to the assignee hereof and incorporated herein by reference.

BACKGROUND

I. Field

The present disclosure relates generally to communication, and more specifically to techniques for conserving battery power in a wireless device.

II. Background

Wireless communication systems are widely deployed to provide various communication services such as voice, packet data, video, broadcast, messaging, and so on. These systems may be multiple-access systems capable of supporting communication for multiple users by sharing the available system resources. Examples of such multiple-access systems include Code Division Multiple Access (CDMA) systems, Time Division Multiple Access (TDMA) systems, and Frequency Division Multiple Access (FDMA) systems.

A wireless device (e.g., a cellular phone) may be able to receive service from one or more wireless systems. Upon power up, the wireless device searches for a system from which it may receive service. If a system is found, then the wireless device may register with the system. The wireless device may then actively communicate with the system or go into an idle mode if communication is not required. If the wireless device subsequently loses the system, then it enters an out of service (OOS) state and attempts to acquire a system in accordance with an OOS procedure. This OOS procedure may direct the wireless device to search for a system and, if a new system is acquired, to register with the new system.

The wireless device may operate in an environment in which it acquires a system but quickly loses the system. In such an environment, the wireless device may expend a large amount of battery power trying to acquire a system. This heavy drain on battery power reduces both standby time and talk time, which is highly undesirable.

There is therefore a need in the art for techniques to mitigate against heavy battery power consumption due to OOS conditions.

SUMMARY

Techniques for conserving battery power in the presence of adverse channel conditions are described herein. A wireless device detects for an adverse channel condition, which may be (1) a frequent out of service (FOOS) condition indicative of frequent in and out of service, (2) an unbalanced forward/reverse link condition indicative of unbalanced coverage for the forward and reverse links, or (3) some other deleterious operating condition. A FOOS condition may be detected based on various parameters such as an average in-service time, the number of lost system connections, the number of systems to which connections have been made, the rate of change for the systems, the altitude of the wireless device, and so on, as described below. An unbalanced forward/reverse link condition may also be detected based on various parameters such as the average in-service time, the number of system access failures, and so on. At least one action to conserve battery power is performed if an adverse channel condition is detected. The battery saving action(s) may include performing system search and acquisition less frequently, disabling system registration, performing registration less frequently, going to sleep, and so on.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The detection and power saving techniques described herein may be used for various wireless communication systems such as CDMA systems, TDMA systems, FDMA systems, Orthogonal FDMA (OFDMA) systems, and so on. A CDMA system may implement a radio technology such as cdma2000, W-CDMA, and so on. cdma2000 covers IS-2000, IS-856, and IS-95 standards. IS-2000 and IS-95 are often referred to as CDMA2000 1x, or simply "1x". A TDMA system may implement a radio technology such as Global System for Mobile Communications (GSM), Digital Advanced Mobile Phone System (D-AMPS), and so on. D-AMPS covers IS-136 and IS-54. These various radio technologies and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. For clarity, certain aspects of the techniques are specifically described below for cdma2000.

Figure 1:
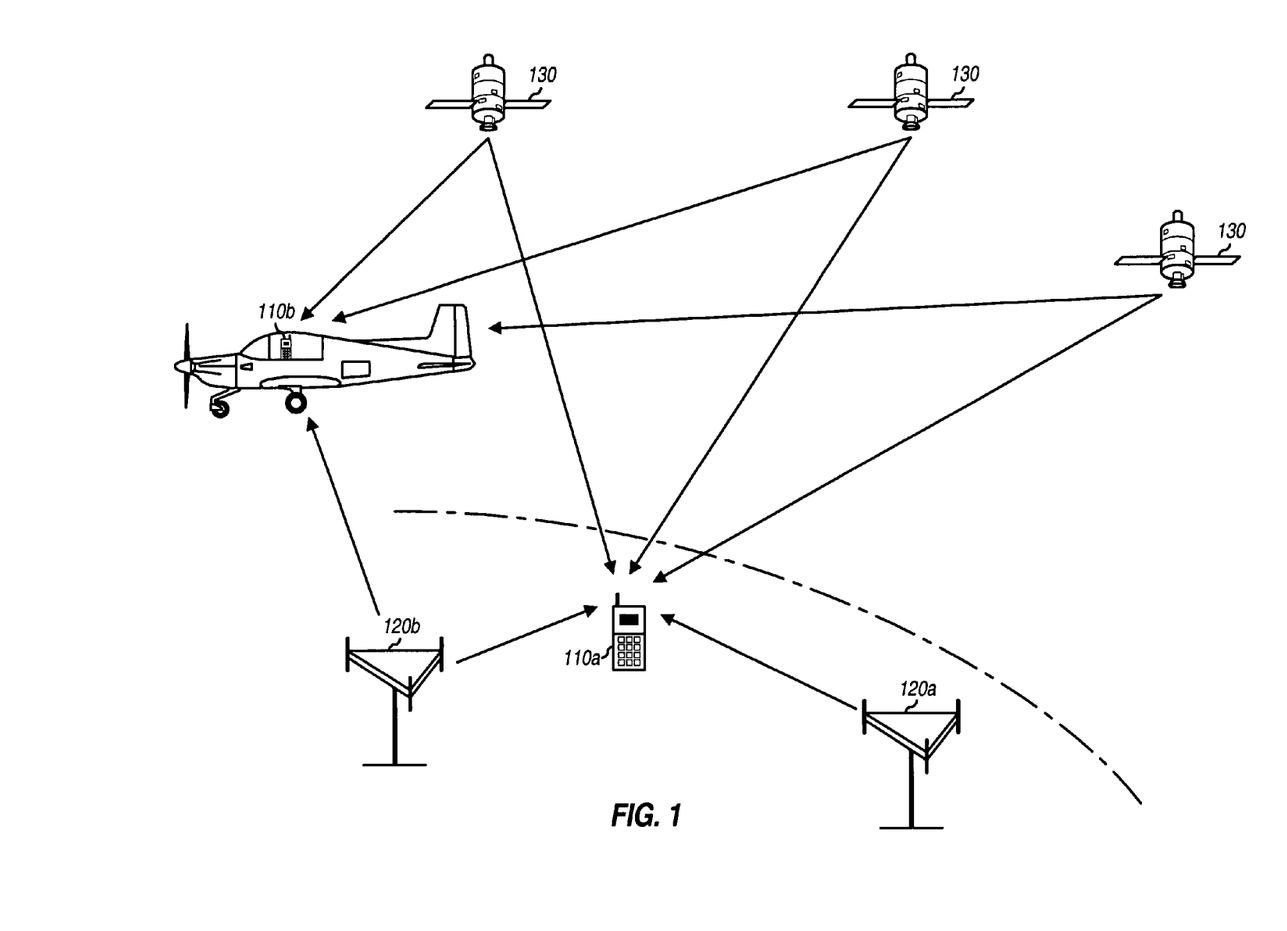
FIG. 1 shows a wireless communication system.

FIG. 1 shows a wireless communication system 100, which may be any of the systems described above. For simplicity, only two wireless devices 110*a* and 110*b* and two base stations 120*a* and 120*b* are shown in FIG. 1. Each base station provides communication coverage for a particular geographic area. A base station is generally a fixed station that communicates with the wireless devices and may also be called a base transceiver station (BTS), a Node B, an access point, and so on.

The wireless devices are typically dispersed throughout the system, and each wireless device may be fixed or mobile. In FIG. 1, wireless device 110*a* is earthbound whereas wireless device 110*b* is airborne. A wireless device may also be called a mobile station, an access terminal, a user equipment, a terminal, a subscriber unit, and so on. A wireless device may be a cellular phone, a personal digital assistant (PDA), a wireless modem, and so on. A wireless device may communicate with zero, one, or multiple base stations on the forward and reverse links at any given moment. The forward link (or downlink) refers to the communication link from the base stations to the wireless devices, and the reverse link (or uplink) refers to the communication link from the wireless devices to the base stations.

A wireless device may also be capable of receiving signals from satellites 130. Satellites 130 may belong to a satellite positioning system such as the well-known Global Positioning System (GPS). Each GPS satellite transmits a GPS signal encoded with information that allows GPS receivers on earth to measure the time of arrival of the GPS signal. Measurements for a sufficient number of GPS satellites may be used to accurately estimate a three-dimensional (3-D) position of a GPS receiver.

Figure 2:
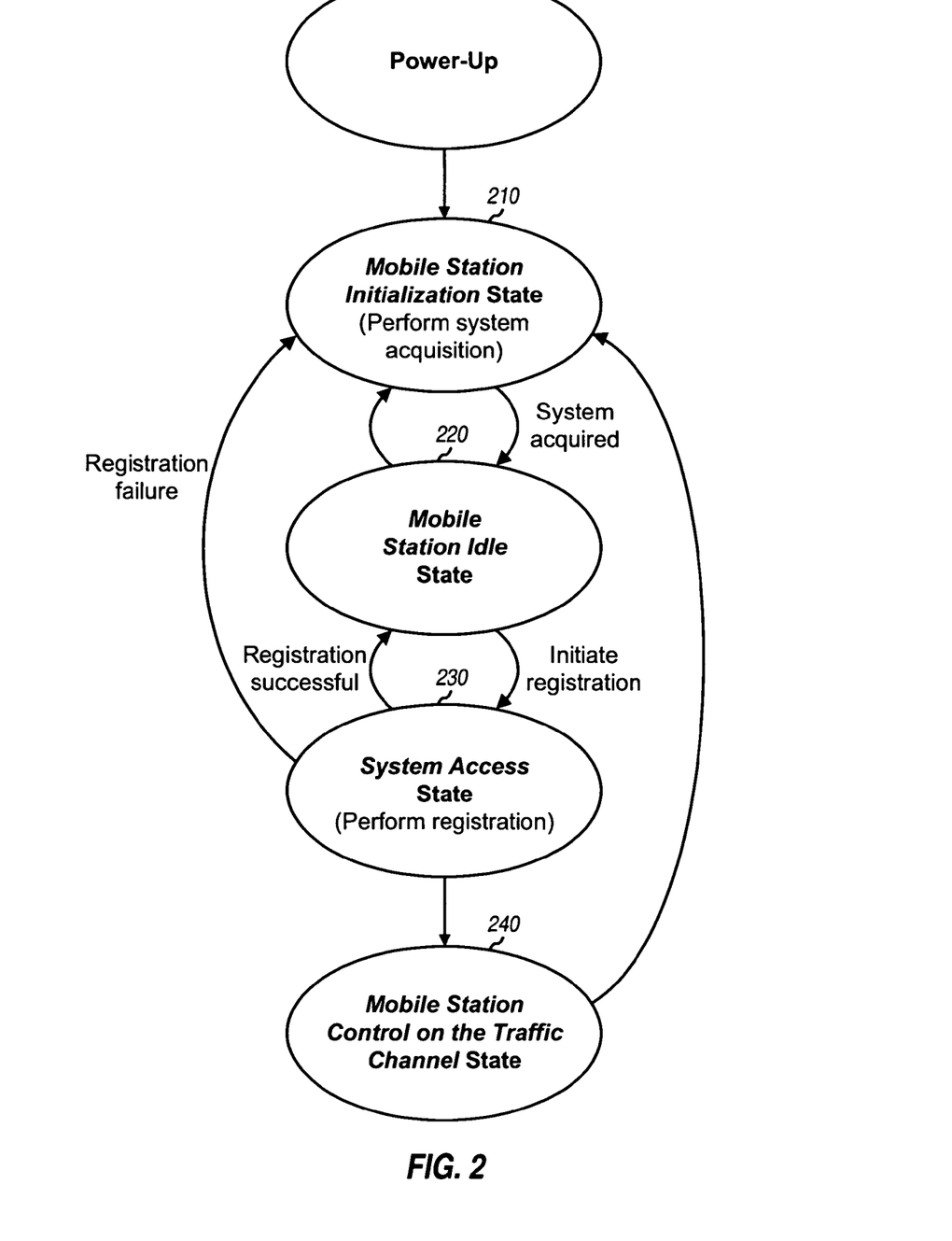
FIG. 2 shows a state diagram of Layer 3 processing states in IS-2000.

FIG. 2 shows a state diagram 200 of Layer 3 processing states in IS-2000. A wireless device enters a Mobile Station Initialization state 210 upon power up. In state 210, the wireless device selects a system and attempts to acquire the selected system. Upon acquiring the system, the wireless device transitions to a Mobile Station Idle state 220. In state 220, the wireless device can perform registration, receive or originate a call, receive or initiate a message transmission, and perform other actions. Upon initiating any of these actions, the wireless device transitions to a System Access state 230.

In state 230, the wireless device exchanges signaling with the system on forward and reverse common channels. If the desired action is registration, then the wireless device sends access probes to the system and monitors for an acknowledgement from the system. The wireless device returns to state 220 after successfully completing registration or returns to state 210 if registration failed. If the desired action involves an active call, then the wireless device proceeds to a Mobile Station Control on the Traffic Channel state 240 and communicates with the system. The wireless device returns to state 210 or 220 upon terminating the call. The wireless device may transition from other states to state 220 if there are no other tasks to perform and to state 210 if there is a failure in accessing or communicating with the system. The processing for the states shown in FIG. 2 is described in 3GPP2 C.S0005-D, entitled "Upper Layer (Layer 3) Signaling Standard for cdma2000 Spread Spectrum Systems Release D," Version 1.0, dated February 2004, which is publicly available.

As shown in FIG. 2, the wireless device attempts to acquire a system when it is first powered up. The wireless device may maintain a Preferred Roaming List (PRL) that identifies "permitted" systems that the wireless device should use and (optionally) "forbidden" systems that the wireless device should not use. The wireless device may select one system at a time from the PRL and attempt to acquire the system. System acquisition may entail tuning to a frequency band used by the system, searching for pilots transmitted by base stations in the system, receiving a Sync Channel Message (SCHM) that carries system timing, synchronizing to the timing of each base station found, receiving a paging channel from a base station, and so on.

After acquiring a system, the wireless device may attempt to register with the system so that it can receive pages and originate or receive calls. For registration, the wireless device performs an access probe procedure to transmit access probes on an access channel and to attempt to access the system. The access probe procedure specifies how the access probes should be transmitted, e.g., when the access probes should be sent and at what power level. The wireless device may transmit one or more access probe sequences until an acknowledgment is received from the system or the maximum number of access probes have been sent. After registering with the system, the wireless device may actively communicate with the system or may return to the idle state if no communication is required.

The wireless device consumes battery power to perform system acquisition and registration. For system acquisition, the wireless device consumes battery power to process signals received on the forward link. For registration, the wireless device consumes battery power to transmit access probes on the reverse link.

After acquiring a system, the wireless device may lose service due to various reasons. For example, the wireless device may lose service due to a fade or other deleterious conditions. The wireless device may also lose service if it has moved into a coverage hole or outside of the coverage area of the system. In any case, upon losing service, the wireless device may enter an out of service (OOS) state and may perform an OOS procedure to attempt to acquire a system. The OOS procedure may direct the wireless device to attempt to acquire any of the permitted systems in the PRL.

The wireless device may encounter a frequent out of service (FOOS) condition. This condition occurs when the wireless device experiences frequent in and out of service and fails to stay connected to a system for sufficiently long time. The wireless device may acquire a system, lose the system immediately, acquire the same system or another system quickly, and lose this system again shortly after. The FOOS condition may arise, e.g., when the wireless device is moving at great velocity (e.g., airborne), when the wireless device is at coverage boundary, and so on.

The wireless device may also encounter an unbalanced forward/reverse link condition. This condition occurs when the wireless device is within the system coverage area on the forward link but is outside the coverage area on the reverse link. Consequently, the wireless device can receive forward link signals from the system but the system is not able to receive access probes sent by the wireless device to access the system. A system access failure may occur when the maximum number of access probes have been sent without receiving an acknowledgement from the system. Frequent system access failures due to transmission of the maximum number of access probes may signify a bad reverse link condition.

The wireless device may consume a large amount of battery power attempting to access the system for both the FOOS and unbalanced forward/reverse link conditions. Hence, battery life may degrade rapidly when the wireless device encounters any of these conditions.

1. Detection of Adverse Channel Conditions

Techniques for detecting adverse channel conditions such as FOOS and unbalanced forward/reverse link conditions are described herein. Techniques for conserving battery power upon detecting any of these conditions are also described. These techniques may mitigate deleterious effects due to adverse channel conditions.

In an embodiment of FOOS detection, a FOOS condition is detected based on an average in-service time (AIST) and the number of lost system connections. An in-service time (IST) is the time duration in which the wireless device stays in a system and may also be referred to as an in-system time, a system dwell time, and so on. The in-service time may be defined as the duration from the time the wireless device acquires a system to the time the wireless device loses the system. System acquisition may be declared, e.g., upon successful decoding of a paging channel or upon satisfaction of some other criterion. System loss may be declared, e.g., if the wireless device cannot find a pilot or cannot decode the paging channel for a certain time period, or upon satisfaction of some other criterion. The in-service time may also be defined in other manners. The average in-service time is the average time duration in which the wireless device stays in a system.

The wireless device may start a timer upon acquiring a system. Upon losing the system, the wireless device may stop the timer and determine the in-service time for the most recent system connection. A system connection refers to a contiguous period of time in which the wireless device stays in a system and can receive service from the system. The wireless device may compute the average in-service time, as follows:

$$AIST(n)=(1-K)\cdot AIST(n-1)+K\cdot IST(n), \qquad \text{Eq (1)}$$

where n is an index for system connection,

IST(n) is the in-service time for the n-th system connection,

AIST(n) is the average in-service time for the n-th system connection, and

K is a filter gain.

Index n may be initialized to one for the first system connection and may be incremented by one for each subsequent system connection. AIST(n) may be initialized to zero prior to the first system connection and may be updated after each system connection. Upon losing the system after the n-th system connection, the average in-service time may be computed as a weighted sum of the average in-service time AIST (n−1) for the prior system connection and the in-service time IST(n) for the current system connection. The filter gain K determines the amount of averaging and ranges from 0 to 1, or 0<K<1. A larger K corresponds to less averaging, and a smaller K corresponds to more averaging.

Equation (1) is for an infinite impulse response (IIR) filter. The average in-service time may also be computed based on some other type of filter or averaging scheme.

The wireless device may identify the FOOS condition as follows:

$$FOOS = \begin{cases} \text{True} & \text{if } n \geq L \text{ AND } AIST(n) \leq AIST_{TH}, \\ \text{False} & \text{if } n < L \text{ OR } AIST(n) > AIST_{TH}, \end{cases} \qquad \text{Eq (2)}$$

where L is the minimum number of system connections needed for FOOS detection, and $AIST_{TH}$ is a threshold used for FOOS detection.

In general, K, L and $AIST_{TH}$ and may be selected to provide good FOOS detection performance. In an embodiment, K is set to 1/8, L is set to 1/K, and $AIST_{TH}$ is set to 10 seconds. K, L and $AIST_{TH}$ may also be set to other values. K, L and $AIST_{TH}$ may be fixed values. Alternatively, K, L and $AIST_{TH}$ may be configurable values that may be selected, e.g., based on the available battery power at the wireless device. For example, a larger value may be used for K, a smaller value may be used for L, and/or a larger value may be used for $AIST_{TH}$ when battery power is low, and vice versa.

In the embodiment shown in equation (2), the FOOS condition is detected if a sufficient number of (at least L) system connections have been made AND the average in-service time is less than or equal to the $AIST_{TH}$ threshold. The FOOS condition is not detected if an insufficient number of (fewer than L) system connections have been made OR the average in-service time is greater than the $AIST_{TH}$ threshold.

Equation (2) uses the average in-service time to detect for the FOOS condition. The average in-service time is a pertinent parameter since it may be used to determine whether it is meaningful to acquire a system to originate or receive a call. Equation (2) also uses the number of system connections n in the FOOS detection to ensure that there are enough input samples for the FOOS detection filter. The FOOS condition may also be detected using other parameters such as, e.g., an average out-of-service (OOS) duration, an altitude estimate for the wireless device, a velocity estimate for the wireless device, and so on.

The wireless device may experience FOOS under various scenarios. A FOOS-terrestrial condition may arise when the wireless device is earthbound and at coverage boundary. A FOOS-airborne condition may arise when the wireless device is airborne, which is a common cause of FOOS. In the airborne scenario, the wireless device observes many different systems in a short period of time, which results in low in-service time. The wireless device may detect for different FOOS conditions and may perform different tasks in order to conserve battery power.

In another embodiment of FOOS detection, different FOOS conditions are detected based on the average in-service time, the number of systems observed by the wireless device, and how often new systems are observed. Upon acquiring a system, the wireless device stores an identifier for the system, stores the start time for the connection, and also starts a timer to keep track of the amount of time the wireless device is connected to the system. For cdma2000, each system is identified by a unique System Identification (SID), and each smaller network within a given system is identified by a unique Network Identification (NID). Each smaller network in cdma2000 is thus uniquely identified by a SID/NID pair.

When the wireless device loses a system due to either bad forward link (e.g., lost of paging channel) or bad reverse link (e.g., transmission of the maximum number of access probes), the wireless device stops the timer and determines the in-service time IST(n) for the most recent system connection. The wireless device also sets a flag if the system lost was due to a system access failure, which may also be referred to as a maximum access probe (MAP) failure.

Figure 3:
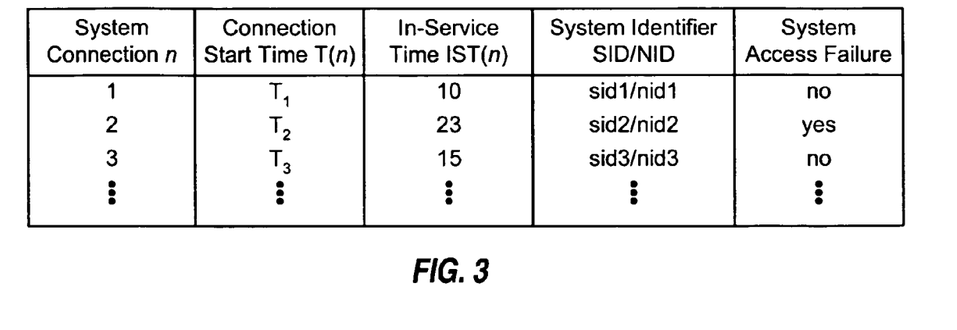
FIG. 3 shows a table of information used for FOOS detection.

FIG. 3 shows an embodiment of a table 300 for storing connection information used for FOOS detection. For each system connection, the wireless device may store the start time T(n) for the connection, the in-service time IST(n) for the connection, the SID/NID pair for the system, and whether a system access failure was encountered. In general, the connection information may include any type of information that is pertinent for FOOS detection.

After a system loss, the wireless device updates the average in-service time AIST(n) with the in-service time IST(n) for the most recent system connection, e.g., as shown in equation (1). If the average in-service time is greater than the $AIST_{TH}$ threshold, then the FOOS condition is not detected. Conversely, if the average in-service time is less than the $AIST_{TH}$ threshold, then the wireless device counts the number of unique SID/NID pairs, which is denoted as N. The wireless device also computes a SID/NID change rate, which is denoted as R. In one embodiment, the wireless device determines whether the last M system connections are for different SID/NID pairs and, if yes, computes the SID/NID change rate as the average time between system connections, or R=[T(n)−T(n−M+1)]/(M−1). M may be set to three or some other value. In another embodiment, the SID/NID change rate may be computed as R=[T(n)−T(n−M+1)]/$N_U$, where $N_U$ is the number of unique SID/NID pairs in the last M system connections. The SID/NID change rate may also be computed in other manners.

The wireless device may detect for different FOOS conditions as follows:

$$FOOS = \begin{cases} \text{False} & \text{if } AIST(n) > AIST_{TH}, \\ \text{Terrestrial} & \text{if } AIST(n) \leq AIST_{TH} \text{ AND } (N < N_{TH} \text{ OR } R < R_{TH}), \\ \text{Airborne} & \text{if } AIST(n) \leq AIST_{TH} \text{ AND } N \geq N_{TH} \text{ AND } R \geq R_{TH}, \end{cases} \quad \text{Eq (3)}$$

where $N_{TH}$ is a threshold value for the number of SID/NID pairs, and $R_{TH}$ is a threshold value for the SID/NID change rate.

In general, $N_{TH}$, $R_{TH}$ and $AIST_{TH}$ may be selected to provide good FOOS detection performance. In an embodiment, $N_{TH}$ is set to 3, $R_{TH}$ is set to 3, and $AIST_{TH}$ is set to 60 seconds. $N_{TH}$, $R_{TH}$ and $AIST_{TH}$ may also be set to other fixed or configurable values.

In the embodiment shown in equation (3), the FOOS-terrestrial condition is detected if the average in-service time is less than or equal to the $AIST_{TH}$ threshold AND either the number of SID/NID pairs is less than the $N_{TH}$ threshold OR the SID/NID change rate is less than the $R_{TH}$ threshold. In a FOOS-terrestrial scenario, the wireless device does not observe many different systems and does not change systems rapidly even though the wireless device experiences frequent in and out of service.

In the embodiment shown in equation (3), the FOOS-airborne condition is detected if the average in-service time is less than or equal to the $AIST_{TH}$ threshold AND the number of SID/NID pairs is greater than or equal to the $N_{TH}$ threshold AND the SID/NID change rate is greater than or equal to the $R_{TH}$ threshold. In a FOOS-airborne scenario, the wireless device observes many different systems and changes systems rapidly as it experiences frequent in and out of service.

Equation (3) shows an embodiment of detecting the FOOS-terrestrial and FOOS-airborne conditions. These FOOS conditions may also be detected in other manners and/or with other parameters.

In another embodiment, the FOOS-airborne condition is detected based on a 3-D position estimate for the wireless device. The wireless device may have standalone GPS capability and may be able to derive a 3-D position estimate for itself based on measurements for a sufficient number of GPS satellites (typically four satellites). The 3-D position estimate indicates the latitude, longitude and altitude of the wireless device. The wireless device may identify the FOOS-airborne condition as follows:

$$FOOS - \text{airborne} = \begin{cases} \text{True} & \text{if } Alt > Alt_{TH}, \\ \text{False} & \text{if } Alt \leq Alt_{TH}, \end{cases} \quad \text{Eq (4)}$$

where

Alt is the altitude of the wireless device, and $Alt_{TH}$ is a threshold used for FOOS-airborne detection.

In the embodiment shown in equation (4), the FOOS-airborne condition is detected if the altitude of the wireless device exceeds the $Alt_{TH}$ threshold. The $Alt_{TH}$ threshold may be set to 2500 feet or some other value.

In yet another embodiment, the FOOS-airborne condition is detected based on a combination of the embodiments shown by equations (3) and (4). Table 1 lists the several FOOS-airborne states and the criteria for each FOOS-airborne state.

TABLE 1

| Average In-Service Time | Number of SID/NID Pairs | SID/NID Rate Change | Altitude | FOOS-Airborne State |
|---|---|---|---|---|
| $AIST(n) \leq AIST_{TH}$ | $N \geq N_{TH}$ | $R \geq R_{TH}$ | N/A | FOOS-airborne condition detected but not confirmed |
| $AIST(n) \leq AIST_{TH}$ | $N \geq N_{TH}$ | $R \geq R_{TH}$ | $Alt \geq Alt_{TH}$ | FOOS-airborne condition detected and confirmed |

In the embodiment shown in Table 1, the FOOS-airborne condition is detected but not confirmed if the third part of equation (3) for "airborne" is satisfied AND the altitude of the wireless device is not available. The altitude may not be available if the wireless device does not support standalone GPS feature OR standalone GPS feature is supported but an insufficient number of satellites is available. The FOOS-airborne condition is detected and confirmed if the third part of equation (3) is satisfied AND the altitude of the wireless device exceeds the $Alt_{TH}$ threshold. The FOOS-airborne condition is false if $AIST(n) > AIST_{TH}$, or $Alt < Alt_{TH}$, or $N < N_{TH}$, or $R < R_{TH}$.

In an embodiment, the unbalanced forward/reverse link condition is detected based on the average in-service time and the number of system access failures. The wireless device may count the number of system access failures within the last $T_M$ seconds. The wireless device may then identify the unbalanced forward/reverse link condition as follows:

$$\text{Unbalanced link} = \begin{cases} \text{True} & \text{if } AIST(n) \leq AIST_{TH} \text{ AND } M \geq M_{TH}, \\ \text{False} & \text{if } AIST(n) > AIST_{TH} \text{ OR } M < M_{TH}, \end{cases} \quad \text{Eq (5)}$$

where

M is the number of system access failures within the last $T_M$ seconds, and $M_{TH}$ is a threshold used for unbalanced forward/reverse link detection.

In general, $T_M$ and $M_{TH}$ may be selected to provide good detection performance. In an embodiment, $T_M$ is set to 60 seconds, and $M_{TH}$ is set to 3. $T_M$ and $M_{TH}$ may also be set to other fixed or configurable values.

In the embodiment shown in equation (5), the unbalanced forward/reverse link condition is detected if the average in-service time is less than or equal to the $AIST_{TH}$ threshold AND the number of system access failures within the last $T_M$ seconds is equal to or greater than the $M_{TH}$ threshold. The unbalanced forward/reverse link condition is not detected otherwise.

In general, the wireless device may detect for a single FOOS condition, e.g., as shown in equation (2), or different FOOS conditions, e.g., as shown in equations (3). The wireless device may also detect for an unbalanced forward/reverse link condition, e.g., as shown in equation (5). The wireless device may detect for the FOOS and unbalanced forward/reverse link condition based on the parameters described above and/or other parameters.

2. Power Saving Actions

The wireless device may declare an adverse channel condition whenever a FOOS condition or an unbalanced forward/reverse link condition is detected. If an adverse channel condition is not detected, then the wireless device performs system search and acquisition in the normal manner in the OOS state.

If a FOOS condition is detected, then the wireless device may perform any one or all of the following actions in order to conserve battery power:

Perform system search and acquisition less frequently,
Disable registration or limit registration attempts, and
Go to sleep.

The wireless device may attempt to acquire a system less frequently if a FOOS condition is detected. In a FOOS scenario, the wireless device does not stay in a system long enough to use any communication service (e.g., to originate or receive a call) before the wireless device loses the system again. Hence, it is not meaningful for the wireless device to search hard and frequently for any system since the wireless device could lose the system again quickly. The wireless device may then attempt system acquisition less frequently (with a lower duty cycle or at a lower rate) when a FOOS condition is detected. The time interval between system acquisition attempts may be extended when the FOOS condition is detected. This time interval may be incrementally extended each time the wireless device loses the system quickly. The wireless device may also search for fewer systems and/or perform system search over a smaller search space.

The wireless device may disable registration or limit registration attempts when a FOOS condition is detected, which may be beneficial if the wireless device is crossing system or network boundary. In one embodiment, the wireless device completely disables registration as long as the FOOS condition is detected. In another embodiment, the wireless device attempts registration less frequently when the FOOS condition is detected. For example, the wireless device may attempt registration no more than once every predetermined time period (e.g., 20 minutes). This time period may be fixed or configurable, e.g., determined based on the available battery power at the wireless device. Limiting registration attempts by waiting a certain period of time before attempting the next registration is also referred to as registration backoff. The registration backoff may also be performed in accordance with system parameters.

The wireless device may go to sleep for a particular time period upon detecting a FOOS condition. The sleep period may be selected based on various factors such as the available battery power at the wireless device, the number of lost system connections, and so on. While asleep, the wireless device may power down as much circuitry as possible in order to conserve battery power.

The wireless device may perform different actions for different FOOS conditions. Furthermore, the wireless device may perform a given action in different manners (e.g., sleep for different durations) for different FOOS conditions.

In an embodiment, the wireless device performs the following actions if the FOOS-terrestrial condition is detected:

Limit registration attempts, and
Go to sleep.

In an embodiment, the wireless device performs the following actions if the FOOS-airborne condition is detected in equation (3) or (4) or if the FOOS-airborne condition is detected but not confirmed in Table 1:

Disable registration, and
Go to sleep for a shorter time period.

In an embodiment, the wireless device performs the following actions if the FOOS-airborne condition is detected and confirmed in Table 1:

Disable registration,
Go to sleep for a longer time period,
Upon wakeup from sleep, skip system acquisition but update position estimate and check altitude,
Perform system acquisition if altitude is less than $Alt_{TH\_low}$, and
If GPS is lost, then perform actions for FOOS-airborne condition detected but not confirmed.

The $Alt_{TH\_low}$ threshold may be selected to provide good performance. In an embodiment, $Alt_{TH\_low}$ is set to 500 feet. $Alt_{TH\_low}$ may also be set to other fixed or configurable values.

In an embodiment, the wireless device performs the following action if an unbalanced forward/reverse link condition is detected:

Limit registration attempts.

Excessive system access failures may be due to a bad reverse link condition. In this case, the wireless device may perform system search in the normal manner (since the forward link may be good) but may attempt registration less frequently in order to conserve battery power.

In general, any set of power saving actions may be performed for any adverse channel condition. The action(s) to be performed may also be dependent on the available battery power at the wireless device and/or other information available to the wireless device.

Figure 4:
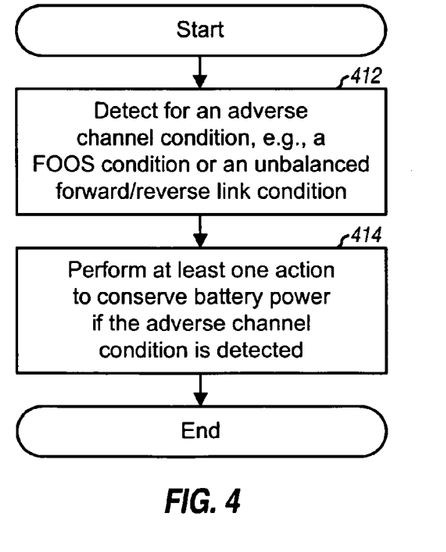
FIG. 4 shows a process for mitigating against adverse channel conditions.

FIG. 4 shows an embodiment of a process 400 for mitigating against adverse channel conditions. An adverse channel condition is detected (block 412). An adverse channel condition may be a FOOS condition indicative of frequent in and out of service. An adverse channel condition may also be an unbalanced forward/reverse link condition indicative of unbalanced coverage for the forward and reverse links. A FOOS condition may be detected based on various parameters such as the average in-service time, the number of lost system connections, the number of systems to which connections have been made, the rate of change for the systems, the altitude of the wireless device, and so on. An unbalanced forward/reverse link condition may also be detected based on various parameters such as the average in-service time, the number of access failures, and so on. At least one action to conserve battery power is performed if an adverse channel condition is detected (block 414). The power saving action(s) may include performing system search and acquisition less frequently, disabling system registration, performing registration less frequently, going to sleep, and so on.

Figure 5:
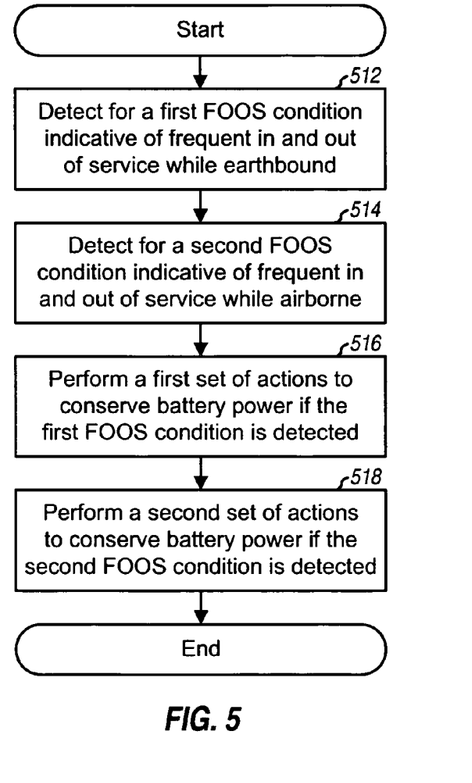
FIG. 5 shows a process for mitigating against FOOS.

FIG. 5 shows an embodiment of a process 500 for mitigating against FOOS. A first FOOS condition indicative of frequent in and out of service while earthbound is detected (block 512). A second FOOS condition indicative of frequent in and out of service while airborne is detected (block 514). The first and second FOOS conditions may be referred to as FOOS-terrestrial and FOOS-airborne conditions, respectively. The FOOS conditions may be detected based on various parameters, as described above. A first set of actions to conserve battery power is performed if the first FOOS condition is detected (block 516). A second set of actions to conserve battery power is performed if the second FOOS condition is detected (block 518). Each set of actions may include any of the power saving actions described above. The two sets may include the same or different power saving actions. A given action may also be performed in different manners for the two FOOS conditions.

Figure 6:
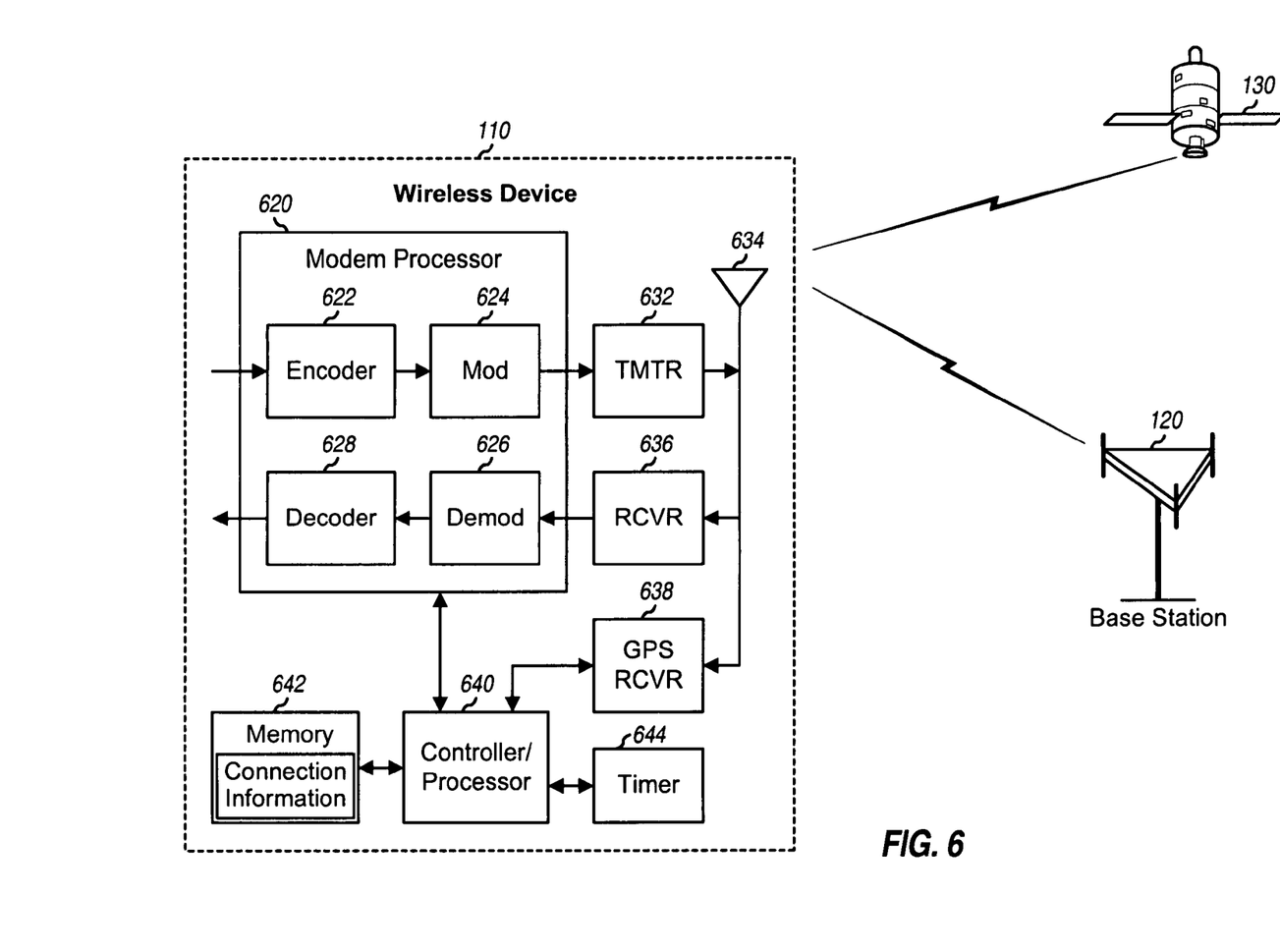
FIG. 6 shows a block diagram of a wireless device.

FIG. 6 shows a block diagram of an embodiment of wireless device 110, which may be any of the wireless devices shown in FIG. 1. On the transmit path, an encoder 622 receives data and signaling to be sent by wireless device 110 and processes (e.g., formats, encodes, and interleaves) the data and signaling in accordance with a suitable encoding scheme. A modulator (Mod) 624 further processes (e.g., modulates and scrambles) the coded data and signaling and generates data chips. In general, the processing by encoder 622 and modulator 624 is determined by the system for which data is sent, e.g., cdma2000, W-CDMA, GSM, and so on. A transmitter (TMTR) 632 conditions (e.g., converts to analog, filters, amplifies, and frequency upconverts) the data chips and generates a reverse link signal, which is transmitted via an antenna 634.

On the receive path, antenna 634 receives forward link signals transmitted by base stations and signals transmitted by GPS satellites. A receiver (RCVR) 636 conditions (e.g., filters, amplifies, frequency downconverts, and digitizes) a received signal from antenna 634 and provides data samples. A demodulator (Demod) 626 processes (e.g., descrambles and demodulates) the data samples and provides symbol estimates. A decoder 628 processes (e.g., deinterleaves and decodes) the symbol estimates and provides decoded data. In general, the processing by demodulator 626 and decoder 628 is complementary to the processing performed by the modulator and encoder at the base stations. Encoder 622, modulator 624, demodulator 626 and decoder 628 may be implemented by a modem processor 620.

Wireless device 110 may have standalone GPS capability and may be able to derive a 3-D position estimate for itself based on signals received from GPS satellites. A GPS receiver 638 receives and processes the signals from GPS satellites and obtains time and/or range measurements for these satellites. GPS receiver 638 and/or a controller/processor 640 may derive a 3-D position estimate for wireless device 110 based on the time and/or range measurements and the known locations of the satellites. The processing to derive a 3-D position estimate based on satellite measurements is known in the art and not described herein.

Controller/processor 640 directs the operation of various processing units at wireless device 110. Controller/processor 640 may implement or direct process 400 in FIG. 4 and/or process 500 in FIG. 5. A memory 642 stores program codes and data for wireless device 110. Memory 642 may also store connection information used to detect for FOOS and unbalanced link conditions, e.g., as shown in FIG. 3. A timer 644 keeps track of the amount of time wireless device 110 is connected to a system and may be reset and stopped by controller/processor 640.

The techniques described herein may be implemented by various means. For example, these techniques may be implemented in hardware, firmware, software, or a combination thereof. For a hardware implementation, the processing units used to detect for an adverse channel condition and to perform power saving actions may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 642 in FIG. 6) and executed by a processor (e.g., processor 640). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to detect an adverse channel condition indicative of frequent in and out of service at least partly based on an in-service connection time for each of a plurality of system connections and a quantity of the plurality of system connections, each system connection corresponding to a contiguous period of time in which the apparatus stays in a wireless system, and to perform at least one action to conserve battery power if the adverse channel condition is detected; and
a memory coupled to the at least one processor.

2. The apparatus of claim 1, wherein the at least one processor is configured to determine an average in-service time indicative of an average time duration for the plurality of system connections, and to detect for the adverse channel condition based on the average in-service time.

3. The apparatus of claim 1, wherein the at least one processor is configured to determine the number of lost system connections, and to detect for the adverse channel condition further based on the number of lost system connections.

4. The apparatus of claim 1, wherein the at least one processor is configured to determine the number of systems to which connections have been made, and to detect for the adverse channel condition further based on the number of systems.

5. The apparatus of claim 1, wherein the at least one processor is configured to determine a rate of change for systems to which connections have been made, and to detect for the adverse channel condition further based on the rate of change for the systems.

6. The apparatus of claim 1, wherein the at least one processor is configured to determine the number of system access failures, and to detect for the adverse channel condition further based on the number of system access failures.

7. The apparatus of claim 1, wherein the at least one processor is configured to determine an altitude of the apparatus, and to detect for the adverse channel condition further based on the altitude.

8. The apparatus of claim 1, wherein the at least one processor is configured to perform system acquisition less frequently if the adverse channel condition is detected.

9. The apparatus of claim 1, wherein the at least-one processor is configured to disable system registration if the adverse channel condition is detected.

10. The apparatus of claim 1, wherein the at least one processor is configured to perform system registration less frequently if the adverse channel condition is detected.

11. The apparatus of claim 1, wherein the at least one processor is configured to go to sleep if the adverse channel condition is detected.

12. A method comprising:
    detecting, using a processor, for an adverse channel condition indicative of frequent in and out of service at least partly based on an in-service connection time for each of a plurality of system connections and a quantity of the plurality of system connections, each system connection corresponding to a contiguous period of time in which a wireless device stays in a wireless system; and
    performing at least one action to conserve battery power if the adverse channel condition is detected.

13. The method of claim 12, wherein the detecting for the adverse channel condition comprises detecting for the adverse channel condition based on an average in-service time, the number of systems to which connections have been made, a rate of change for the systems, an altitude estimate, or a combination thereof.

14. The method of claim 12, wherein the detecting for the adverse channel condition comprises detecting for the adverse channel condition based on an average in-service time and the number of system access failures.

15. The method of claim 12, wherein the at least one action to conserve battery power comprises performing system acquisition less frequently, disabling system registration, performing system registration less frequently, going to sleep, or a combination thereof.

16. An apparatus comprising:
    means for detecting for an adverse channel condition indicative of frequent in and out of service at least partly based on an in-service connection time for each of a plurality of system connections and a quantity of the plurality of system connections, each system connection corresponding to a contiguous period of time in which the apparatus stays in a wireless system; and
    means for performing at least one action to conserve battery power if the adverse channel condition is detected.

17. The apparatus of claim 16, wherein the means for detecting for the adverse channel condition comprises means for detecting for the adverse channel condition based on an average in-service time, the number of systems to which connections have been made, a rate of change for the systems, an altitude estimate, or a combination thereof.

18. The apparatus of claim 16, wherein the means for detecting for the adverse channel condition comprises means for detecting for the adverse channel condition based on an average in-service time and the number of system access failures.

19. The apparatus of claim 16, wherein the at least one action to conserve battery power comprises performing system acquisition less frequently, disabling system registration, performing system registration less frequently, going to sleep, or a combination thereof.

20. A processor readable media for storing instructions operable in a wireless device to:
    detect for an-adverse channel condition indicative of frequent in and out of service at least partly based on an in-service connection time for each of a plurality of system connections and a quantity of the plurality of system connections, each system connection corresponding to a contiguous period of time in which the wireless device stays in a wireless system; and
    perform at least one action to conserve battery power if the adverse channel condition is detected.

21. The processor readable media of claim 20, and further for storing instructions operable to:
    detect for the adverse channel condition based on an average in-service time, the number of systems to which connections have been made, a rate of change for the systems, an altitude estimate, the number of system access failures, or a combination thereof.

22. An apparatus comprising:
    at least one processor configured to detect for at least one frequent out of service (FOOS) condition at least partly based on an in-service connection time for each of a plurality of system connections and a quantity of the plurality of system connections, each system connection corresponding to a contiguous period of time in which the apparatus stays in a wireless system, and to perform at least one action to conserve battery power when any one of the at least one FOOS condition is detected; and
    a memory coupled to the at least one processor.

23. The apparatus of claim 22, wherein the at least one processor is configured to detect for a first FOOS condition indicative of frequent in and out of service while earthbound, to detect for a second FOOS condition indicative of frequent in and out of service while airborne, to perform a first set of at least one action to conserve battery power if the first FOOS condition is detected, and to perform a second set of at least one action to conserve battery power if the second FOOS condition is detected.

24. The apparatus of claim 22, wherein the at least one processor is configured to detect for the at least one FOOS condition based on an average in-service time, the number of systems to which connections have been made, a rate of change for the systems, an altitude estimate, or a combination thereof.

25. The apparatus of claim 22, wherein the at least one processor is configured to perform system acquisition less frequently, to disable system registration, to perform system registration less frequently, to go to sleep, or a combination thereof, when any one of the at least one FOOS condition is detected.

26. The apparatus of claim 1, wherein the at least one processor is configured to detect for an adverse channel condition indicative of unbalanced coverage on forward and reverse links.

27. The method of claim 12, the method further comprising detecting an adverse channel condition indicative of unbalanced coverage on forward and reverse links.

28. The apparatus of claim 16, wherein the means for detecting for an adverse channel condition is configured to detect unbalanced coverage on forward and reverse links.

29. The processor readable media of claim 20, operable in the wireless device to detect for an adverse channel condition indicative of unbalanced coverage on forward and reverse links.

30. The apparatus of claim 22, wherein the at least one professor is configured to detect for an adverse channel condition indicative of unbalanced coverage on forward and reverse links.

* * * * *